(No Model.)

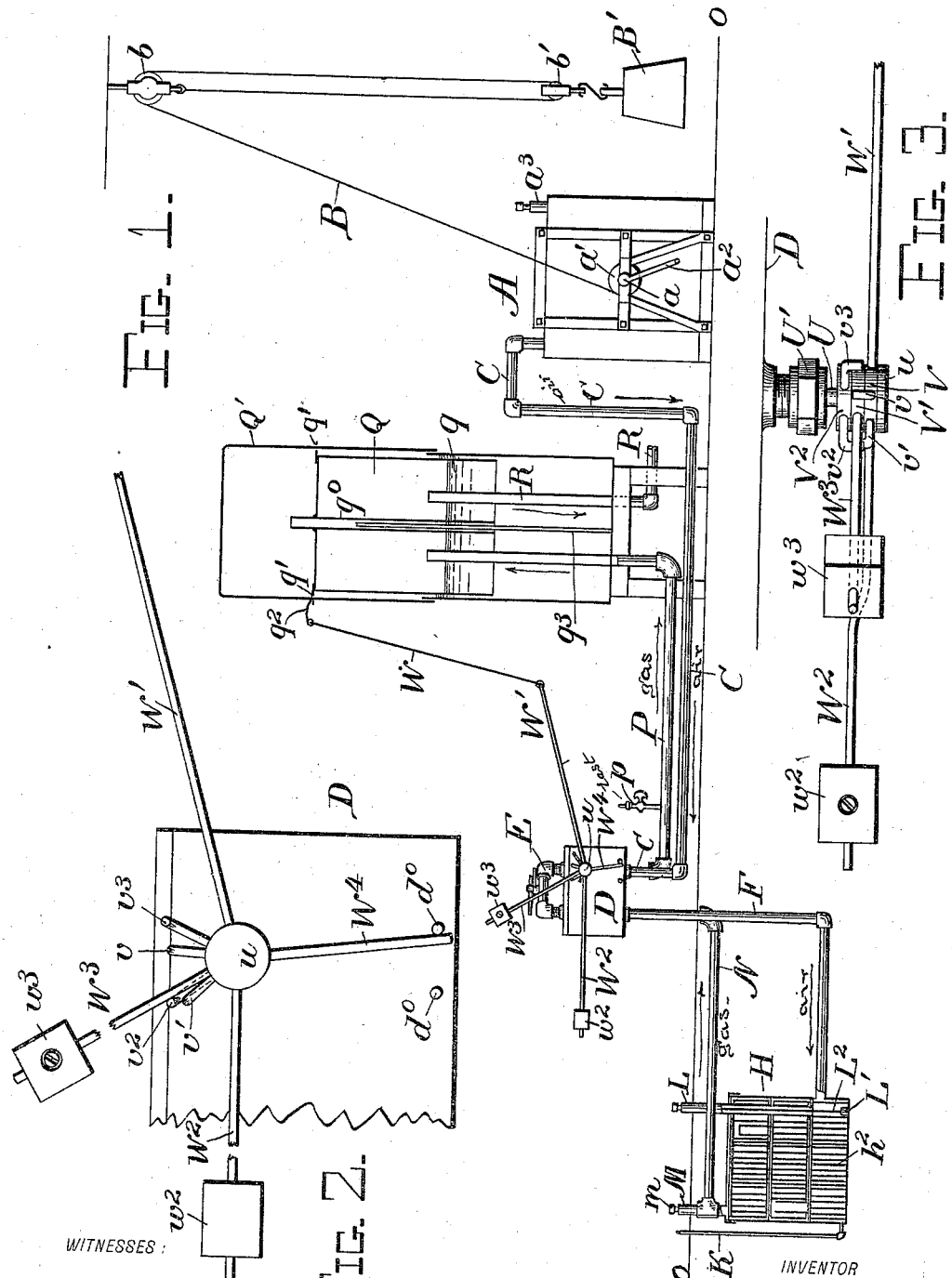

F. J. GUSTINE.
APPARATUS FOR CARBURETING AIR.

No. 545,859. Patented Sept. 3, 1895.

WITNESSES:
Henry Graham
Percy C. Bowen

INVENTOR
Franklin J. Gustine.
BY Whitman & Wilkinson
ATTORNEYS.

(No Model.) 3 Sheets—Sheet 3.
F. J. GUSTINE.
APPARATUS FOR CARBURETING AIR.
No. 545,859. Patented Sept. 3, 1895.
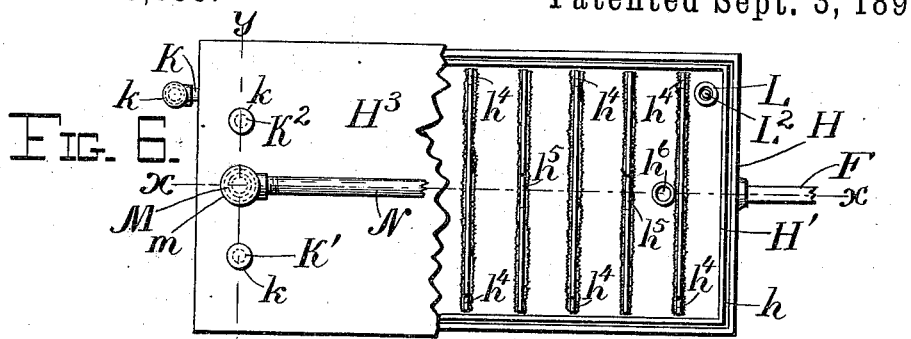
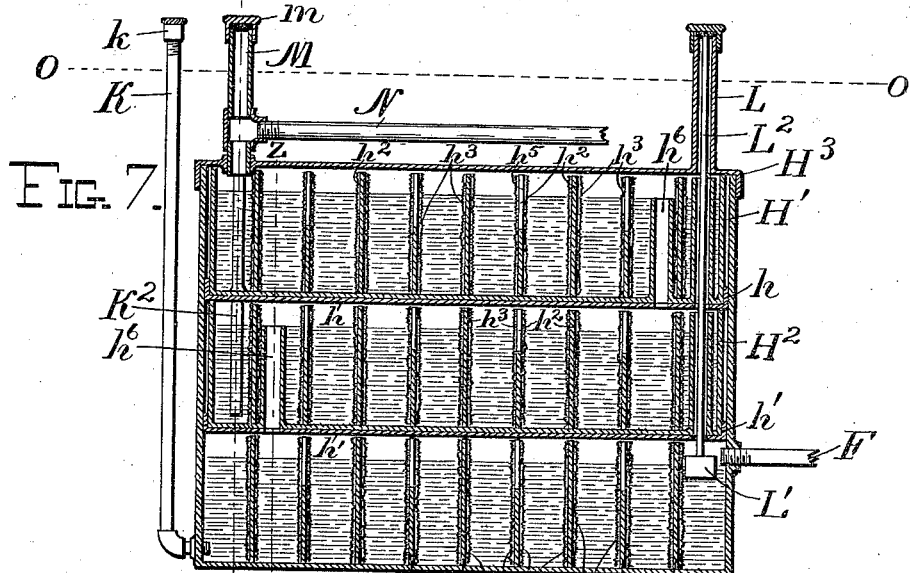
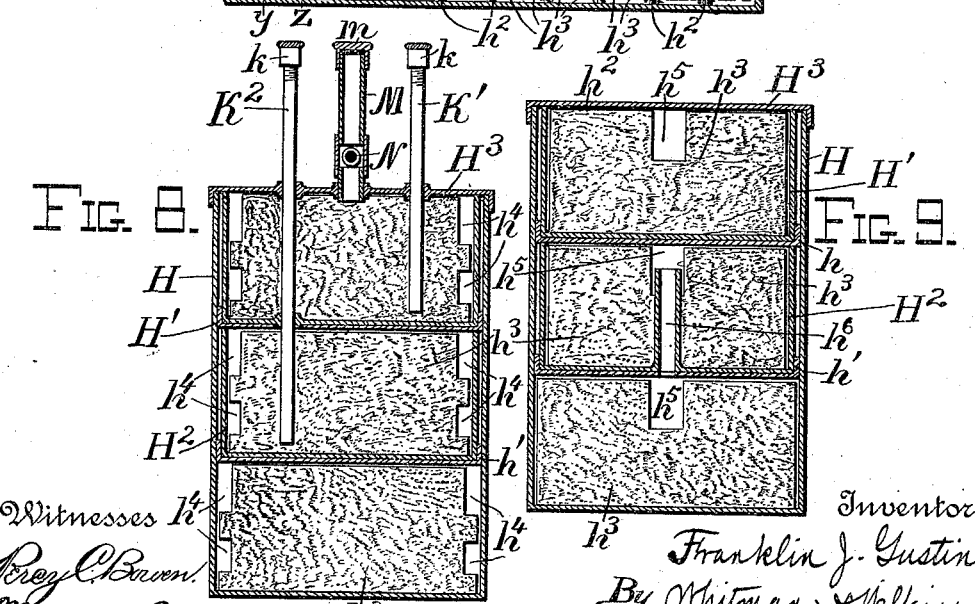
Witnesses
Perez C. Bowen
Maurice Roussa
Inventor
Franklin J. Gustine
By Whitman & Wilkinson
Attorneys.

UNITED STATES PATENT OFFICE.

FRANKLIN J. GUSTINE, OF NEW ORLEANS, LOUISIANA, ASSIGNOR, BY MESNE ASSIGNMENTS, TO ANNA A. E. BULLIN, OF SAME PLACE.

APPARATUS FOR CARBURETING AIR.

SPECIFICATION forming part of Letters Patent No. 545,859, dated September 3, 1895.

Application filed January 11, 1895. Serial No. 534,551. (No model.)

*To all whom it may concern:*

Be it known that I, FRANKLIN J. GUSTINE, a citizen of the United States, residing at New Orleans, in the parish of Orleans and State of Louisiana, have invented certain new and useful Improvements in Apparatus for Carbureting Air; and I do hereby declare the following to be a full, clear, and exact description of the invention, such as will enable others skilled in the art to which it appertains to make and use the same.

My invention relates to improvements in apparatus for carbureting air and especially for charging air with hydrocarbon vapors from gasoline, naphtha, or like volatile hydrocarbon fluids; and the said invention consists in certain novel features hereinafter described and claimed.

Reference is had to the accompaning drawings, wherein the same parts are indicated by the same letters throughout the several views.

Figure 4:
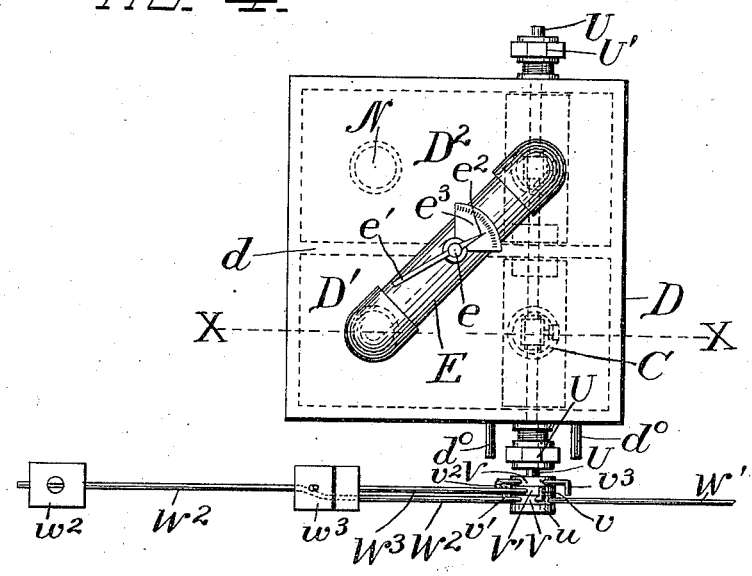
Figure 5:
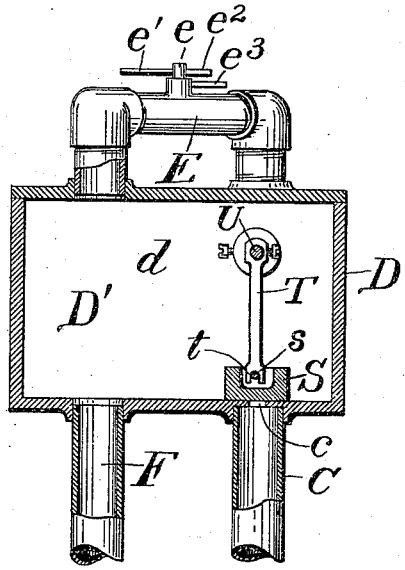

Figure 1 represents a diagrammatic view, in elevation and partly in section, of the complete apparatus. Fig. 2 represents a side elevation, on an enlarged scale, of the mechanism for regulating the motion of the valves which control the flow of air through the apparatus. Fig. 3 represents a plan view of the device shown in Fig. 2. Fig. 4 represents a plan view of the double box through which the air and the gas pass. Fig. 5 represents a vertical section along the line X X of Fig. 4 and looking toward the top of the sheet. Fig. 6 represents a plan view of the carburetor, parts being broken away. Fig. 7 represents a vertical section of the carburetor shown in Fig. 6 along the line $x\ x$ of the said figure. Fig. 8 represents a vertical section through the device shown in Figs. 6 and 7 along the line $y\ y$ of the said figures, and Fig. 9 represents a section of the device shown in Fig. 7 along the line $z\ z$ of the said figure.

A represents an air-pump of any suitable construction and driven by any suitable power; but I prefer to drive the same by means of the drum $a'$, mounted on the shaft $a$, on which is wound the rope B by means of the hand-crank $a^2$. $a^3$ represents the pipe for filling the pump with water. This rope B passes over the blocks $b$ and $b'$, the lower one of which supports the weight B'. The apparatus is so arranged that when the weight has been hoisted to its highest position by winding the rope B on the drum $a'$ it will furnish motive power to drive the apparatus for a considerable length of time.

C represents an air-pipe leading from the air-pump A and opening into the air-chamber D' of the double box D. The partitions $d$ divide this double box into an air-chamber D' and a gas-chamber $D^2$, which chambers are connected together by means of the pipe E.

$e$ represents a regulating-valve which is provided with an arm $e'$ and pointer $e^2$, said pointer being so arranged over the quadrant $e^3$ as to indicate the position of the regulating-valve, and hence the relative proportion of air flowing from the air-chamber to gas-chamber.

Part of the air reaching the chamber D is shunted through the pipe E into the gas-chamber, the remaining portion of the said air being forced through the pipe F, opening into the bottom of the air-chamber and connecting it with the carburetor. This carburetor is preferably made in two or more tiers of evaporating-tanks, the whole being buried beneath the surface of the ground, which surface is indicated by the line O O. (Shown in Figs. 1 and 7.) I preferably use a carburetor essentially of a main tank H, inclosing two or more smaller tanks H' and $H^2$, mounted on shelves or ribs $h$ and $h'$, attached to the side of the main tank. Pans may be used instead of ribs or shelves, if desired. There are thus formed three independent fluid-chambers, across which are arranged a plurality of places $h^2$, which to increase the evaporating-surface are preferably covered with fibrous material $h^3$. Some material that is kept wet by capillary action—such as flimsy cotton cloth—is preferred. These plates are provided with air-passages cut through them, and in order to obtain the longest possible contact between the air and the fluid these air-passages are cut alternately out of the ends and out of the center of the plate, as shown at $h^4$ and $h^5$ in Figs. 8 and 9. Any other method of imparting a serpentine motion to the air may be adopted, if desired.

The height of the fluid in each of the upper tanks is regulated by the overflow-pipes $h^6$, which discharge the fluid into the tank below, while the height of the fluid in the lower tank is indicated by the gage L, which has a rod $L^2$, connected to the float $L'$.

The various tanks are supplied with the gas-yielding fluid through the pipe M, which is normally kept closed by the cap $m$. The fluid is poured through this pipe M until it overflows the top of the upper pipe $h^6$ in the tank $H'$, and then the excess flows down, filling the tank $H^2$ up to the top of its overflow-pipe $h^6$, and then fills the base of the tank $H'$ to the required height, as indicated by the gage L.

The tanks H, $H'$, and $H^2$ are provided with pipes K, $K'$, and $K^2$, respectively, by means of which the contents of any one or all of the tanks may be pumped out, if desired. The said pipes are kept normally closed by means of caps $k$. The air enters the carburetor at F and escapes, laden with the combustible vapor, at the pipe N, which carries it to the gas-chamber $D^2$. The gas entering this chamber $D^2$ through the pipe N is mixed with the air $D^2$ which is shunted from the air-chamber $D'$ through the pipe E, and the mixture is carried off through the pipe P to the gas-receiver Q.

The amount of air to be mixed with the gas in the chamber $D^2$ is regulated by adjusting the valve $e$ in accordance with the brightness of the flame at the test-jet $p$. The gas-holder Q is partly immersed in the liquid $q$, and may be of any ordinary construction.

I preferably use a cylindrical float or receiver Q, provided with guides $q'$, which travel up and down the sides of the frame $Q'$, the center of the said cylindrical float Q being provided with a hollow cylinder projecting therethrough, in which passes the guide-rod $q^3$.

The gas is carried off from the receiver to the point of consumption by means of the pipe R. It will be seen that if air be forced from the pump A through the pipe C part of it will be carried along through the pipe F, and passing through the tortuous passages in the carburetor will return through the pipe N to the gas-chamber $D^2$, where it will become mixed with the air forced in from the pipe E, and will thence be carried by the pipe P to the gas-receiver Q, whence it is carried away for consumption by means of the pipe R. That portion of the air which passes through the carburetor will become charged with the hydrocarbon vapor from the volatile liquid, and the use of the cloths $h^3$, which are kept wet by capillary attraction, greatly enlarges the area of the evaporating-surface. It will be noted that when the tanks are filled with the crude material there will be more volatile matter present and the less area of evaporating-surface will satisfy the requirements of the apparatus; but that when the lighter particles have been evaporated off, leaving the heavier and less volatile residue, the area of the wet cloths exposed to the current of air going through the carburetor will be largely increased, while between these extremes the area of the plates exposed will adjust itself automatically to the required conditions, and thus the carburetor will to a certain extent become self-regulating.

When the residue in the bottom of the various tanks accumulates to such a degree as to impair the efficiency of the carburetor, the tank should be pumped out by means of the pipes K, $K'$, and $K^2$.

In order to regulate the quantity of gas manufactured in the apparatus, and also to prevent waste of power, I provide the automatic valve system shown in Figs. 1 to 5.

Referring to Fig. 1, $q^2$ represents an arm projecting from the gas-receiver Q, and consequently rising and falling therewith as the quantity of gas within the receiver varies. To this arm $q^2$ a rod W is attached, connected at its lower end to the lever $W'$, rigidly attached to the collar V, which is loose on the rock-shaft U, which shaft passes through the air and gas chambers $D'$ and $D^2$ and is provided with stuffing-boxes $U'$ on either side of the said chambers. To this shaft U are rigidly attached two arms T, slotted, as at $t$, to engage the cross-rod $s$ on the slide-valves S, as shown in Fig. 5. There is one of these valves in each of the air and gas chambers; but as they are in every way similar in construction but one is shown in detail in the drawings. The outer end of this shaft U carries a cap $u$, which serves to hold the collars V and $V'$ in place on the shaft U. The weight of the rod W and lever $W'$ is counterbalanced by the adjustable weight $w^2$ on the arm $W^2$. This collar V also carries the two actuating hook-shaped arms $v$ and $v'$. Inside of this collar V is a second loose collar $V'$, which carries the lever $W^3$ and the adjustable actuating-weight $w^3$. Inside of the collar $V'$ is a third collar $V^2$, which is rigidly attached to the shaft U and carries two hook-shaped arms $v^2$ and $v^3$, adapted to be struck by the lever $W^3$ and to be turned thereby through a small angle sufficient to rotate the shaft far enough to move the valves S on or off their seats $c$.

The position shown in the drawings is that when both valves are closed—when no air is passing through the apparatus, and yet when there is sufficient gas stored up in the gas-receiver for immediate needs. In this position it will be seen that the air-delivery pipe C is closed by the valve S, and hence the air-pressure in the said pipe C will soon become sufficient to stop the pump and to cause all parts of the gas-generating apparatus to lie idle.

Now suppose enough gas be consumed out of the receiver Q to cause the same to fall and to push down the lever $W'$ until the operating-weight $w^3$ is on the opposite side of the perpendicular line through the center of the shaft U. This weight will then begin to fall, and the lever $W^3$ striking the hook-shaped arm $v^3$, will swing the same through a small angle, causing the shaft U to revolve through a small angle and moving the valves S off their seats. The throw of the valves is limited by the arm W⁴, which is fast to the collar V²
and brings up against one or the other of the
stops $d^0$. It will be seen that as soon as the
valves are open the flow of air from the pipe
C will begin, and the pressure in the said
pipe being relieved the weight B' will set the
air-pump A in operation, and the air flowing
through the carburetor and across the pipe
E the manufacture of the gas will be automatically resumed.

When the apparatus has manufactured
enough gas to raise the receiver above a predetermined height, the arm W' will be lifted,
causing the arm $v$ to raise the lever $W^3$ and
weight $w^3$ to the vertical position and to push
it beyond this position, so that it will fall on
the opposite side, the lever $W^3$ striking the
arm $v^2$ and causing the valves to close, thus
stopping the apparatus for the manufacture
of gas. It will be seen that the lever $W^3$ is
alternately lifted by the hook-shaped arms $v$
and $v'$ and alternately strikes the hook-shaped
arms $v^2$ and $v^3$. Since the force required to
move the valves would vary under different
conditions, the weight $w^3$ is preferably made
so as to be clamped at any desired position on
the lever $W^3$, and thus a shorter or longer lever-arm may be obtained. Thus it will be seen
that a cheap, simple, comparatively odorless,
and self-regulating gas apparatus is obtained.

The various advantages of the herein-described construction will readily suggest themselves to any one skilled in the art.

It will be obvious that many modifications
of the herein-described construction might be
made which could be used without departing
from the spirit of my invention.

Having thus described my invention, what
I claim, and desire to secure by Letters Patent
of the United States, is—

1. In an apparatus for the manufacture of
gas, the combination with an air pump, and
means for operating said air pump, of an air
chamber connected to said air pump, a carburetor connected to said air chamber, a gas
chamber connected to said carburetor, a shunt
air pipe connecting said air chamber and
said gas chamber, and means for regulating
the proportion of air passing through said
shunt pipe, a gas receiver connected to said
gas chamber, and means operated by said gas
receiver for automatically cutting off the supply of gas from said gas chamber to said receiver, and the supply of air from said pump
to said air chamber, substantially as described.

2. In an apparatus for the manufacture of
gas, the combination with an air pump, of a
carburetor connected to said pump, a gas and
air receiver connected to said carburetor, a
slide valve controlling the flow of air through
the apparatus, a rock shaft, an arm connecting said rock shaft and said sliding valve, a
weighted lever revolubly mounted on said
rock shaft and having a limited motion on
either side of the perpendicular arms projecting from said rock shaft and adapted to be
struck by said weighted lever, an arm projecting from said rock shaft and connected by a
cord to the float of the gas receiver, whereby
the said weighted lever is brought first to one
side of the vertical line and then to the other;
a lever arm on the opposite side of said rockshaft, and a counterpoise weight attached
thereto, substantially as and for the purposes
described.

3. In an apparatus for the manufacture of
gas the combination with an air pump, and
means for operating said air pump, of an air
chamber connected to said air pump, a carburetor connected to said air chamber, a gas
chamber connected to said carburetor, a
shunt air pipe connecting said air chamber
and said gas chamber, and means for regulating the proportion of air passing through said
shunt pipe, a gas receiver connected to said
gas chamber, a rock shaft journaled in said
air chamber and in said gas chamber, valves
for controlling the admission of air and the
discharge of gas operated by said rock shaft,
a weighted lever revolubly mounted on said
rock shaft and having a limited motion on
either side of the perpendicular, arms projecting from said rock shaft and adapted to
be struck by said weighted lever, and means
operated by the gas in the receiver whereby
the said weighted lever is brought first to one
side of the vertical line and then to the other,
substantially as and for the purposes described.

4. In an apparatus for the manufacture of
gas, the combination with an air pump, and
a suspended weight adapted to run said air
pump at the normal pressure, but to be arrested when the pressure of the air in the pump
becomes excessive, of an air chamber connected to said air pump, a carburetor connected to said air chamber, a gas chamber connected to said carburetor, a shunt air pipe connecting said air chamber and said gas chamber, and means for regulating the proportion
of air passing through said shunt pipe, a gas receiver connected to said gas chamber, a rock
shaft journaled in said air chamber and in said
gas chamber, valves for controlling the admission of air and the discharge of gas operated by
said rock shaft, a weighted lever revolubly
mounted on said rock shaft and having a limited motion on either side of the perpendicular, arms projecting from said rock shaft and
adapted to be struck by said weighted lever,
and means operated by the gas in the receiver
whereby the said weighted lever is brought
first to one side of the vertical line and then
to the other, substantially as and for the purposes described.

5. In an apparatus for the manufacture of
gas, the combination with an air pump and
a weight operating said air pump, of an air
chamber connected to said air pump, a carburetor connected to said air chamber, a gas
chamber connected to said carburetor, a shunt
air pipe connecting said air chamber and said
gas chamber, and means for regulating the
proportion of air passing through said shunt pipe, a gas receiver connected to said gas chamber, valves mounted in both said air chamber and said gas chamber, and controlling the influx of air and the efflux of gas, respectively, and means for simultaneously opening or closing both of said valves, substantially as described.

In testimony whereof I affix my signature in presence of two witnesses.

FRANKLIN J. GUSTINE.

Witnesses:
V. I. JOUBERT,
OSCAR SCHREIBER.